3,115,410
METHOD FOR PRODUCING A BARLEY FRACTION HAVING THICKENING PROPERTIES AND THE PRODUCT RESULTING THEREFROM
George W. Huffman, Crystal Lake, Ill., assignor to The Quaker Oats Company, Chicago, Ill., a corporation of New Jersey
No Drawing. Filed Dec. 19, 1958, Ser. No. 781,436
4 Claims. (Cl. 99—80)

This invention relates to a thickening agent or stabilizer for aqueous compositions and to a process for producing the same from barley.

Stabilizers or thickening agents are used in various aqueous compositions such as sizing, printing ink and cosmetics and in aqueous food products such as ice ice crream, sherbets, ices, icings, cream cheeses, etc., to produce the proper combination of physical characteristics such as proper viscosity, body and texture, and in the case of ice cream, resistance to formation of ice crystals after standing for any considerable period of time. Thickening agents are also useful as binders in meat products such as sausage. Such substances as gelatin, sodium alginate, algin, pectin, agar, Irish moss and psyllium seed have been commonly used as such agents but are often costly and not entirely satisfactory.

Thickening agents for aqueous compositions have also been produced from oats. However, such agents derived from oats are sometimes less than satisfactory, particularly in food products, for the reason that they carry over to some extent the characteristic flavor of oats and tend to undesirably darken the color of the food product.

It is an object of this invention to provide a thickness for aqueous compositions which is bland in flavor and which imparts a minimum of color to the compositions in which it is used.

Another object of the invention is to provide a thickener for aqueous compositions which can be produced at minimum cost for a given amount of thickening or increased viscosity imparted to the composition.

In accordance with the invention these objects are accomplished by a substantially hull-free milled barley fraction having a relatively low starch content as compared to dehulled barley and which has been heat treated so as to inactivate enzymes normally inherent in the barley fraction and deleterious to its thickening or gum properties.

The barley fraction of this invention is produced by a special heat treatment and special milling of the barley. The special heat treatment is effected prior to the special milling, subsequent thereto, or in between individualized steps of the special milling. Essentially it involves heating the barley in the presence of steam at a temperature no less than about 212° F. for at least about one minute, the upper limit on temperature of heating and holding time being lower than that at which gelatinization of the starch in the barley occurs. Preferably the heat treatment is at a temperature of no less than 212° F. for a holding time of about one minute to about twenty minutes. For example a temperature of about 250° F. for about six minutes has been found especially suitable.

The special milling essentially involves the following steps: (1) dehulling the barley, (2) pulverizing the barley until substantiall all of it is finer than about 20 mesh and at least about 45% of it is finer than about 120 mesh, and (3) separating from the pulverized barley a fraction having a mesh size coarser than about 120 mesh. Throughout the description of this invention the mesh sizes given are the standard U.S. sieve series.

In a preferred embodiment of the invention the aforementioned separation of the barley fraction is effected so as to obtain a fraction having a mesh size finer than about 100 mesh and coarser than about 120 mesh. In a specific embodiment of the invention the heat treatment and milling steps are carried out in the following order: (1) the whole barley is substantially dehulled employing conventional equipment such as a pearler normally employed in producing pearled barley; (2) the dehulled barley is heated in the presence of steam at a temperature no less than about 212° F. for at least about one minute employing conventional heat-treatment equipment; (3) the heat-treated barley is pulverized in any grain milling pulverizer such as a hammer mill equipped with a round hole perforated metal screen of such size as to provide pulverized barley all of which has a particle size finer than about 20 mesh and of which at least 45% by weight in finer than about 120 mesh; (4) the desired barley product is separated out as a fraction having a mesh size finer than about 100 mesh and coarser than about 120 mesh employing conventional sieve shaker equipment or air classification systems; and finally (5) residual hull slivers are removed from the product by passing an air current therethrough employing conventional equipment such as an aspirator.

The invention will be further illustrated but is not limited by the following examples in which the viscosity or thickening ability of the barley fractions obtained was determined by the following procedure:

A representative 40 grams sample of product was suspended in 300 milliliters of distilled water at 26° C. by mixing in a Waring Blendor (high speed) for 30 seconds. The suspension was then transferred to a Brabender recording viscosimeter and the viscosity recorded for a 20 minute interval. The viscosimeter was equipped with a large spring and star paddle and operated with a bowl speed of 52 revolutions per minute.

*Example 1*

Whole barley was substantially dehulled by a light pearling operation on a pearler. The amount of pearlings (hull) removed constituted about 10% by weight of the whole barley. The dehulled barley was heated at about 222° F. in the presence of steam for about 20 minutes. The resulting heat-treated barley material was allowed to cool to room temperature and then pulverized in a hammer mill through a 0.039 round hole perforated metal screen (substantially equivalent to 100% through a 20 mesh U.S. screen). The pulverized barley material was then fractionated by sieving with a 120 mesh screen to yield 54.4% by weight of the dehulled barley of a fraction coarser than 120 mesh (overs of the 120 mesh screen). The viscosity or thickening ability of the fraction dispersed in water was 538.

*Example 2*

The procedure of Example 1 was repeated with the exception that the heat treatment of the dehulled barley was omitted. The viscosity of the product dispersed in water was 166.

*Example 3*

The procedure of Example 1 was repeated with the exception that the sieve fractionation was omitted. The viscosity of the product dispersed in water was 370.

*Example 4*

The procedure of Example 1 was repeated with the exception that the fractionation by said sieving was preceded by sieving through a 100 mesh screen to remove ground barley material coarser than 100 mesh. The yield of the resulting barley gum fraction (−100 mesh and +120 mesh) was 5.2% by weight of the dehulled barley. To improve the appearance of the product residual hull slivers were removed by aspiration. The viscosity of the gum fraction dispersed in water was 1150.

Examples 1 and 4 produced the barley fraction product of this invention. Example 2 demonstrated that when the special heat-treatment of this invention is omitted the thickening ability or viscosity of the product dispersed in water is unsatisfactory. Example 3 demonstrated that when the sieve fractionation of this invention is omitted the thickening ability of the barley product produced is considerably smaller particularly when compared to the product of Example 4 which is a preferred embodiment of this invention.

Quantitative determinations of the starch content by standard methods show that considerably less starch is contained in the barley product of this invention than is contained in the dehulled barley from which it is derived. This would indicate when comparing Examples 1 and 4 to Example 3, in which no fractionation was made, that the thickening properties of the product of this invention are attributable to unknown entities isolated or at least concentrated by the process of this invention.

When the barley product of this invention is incorporated in various food compositions a food product is obtained which is not substantially changed in color as compared to food compositions lacking the barley product. Similarly the barley product does not impart foreign flavors to the food composition. Furthermore the higher viscosity desired in the composition is obtained with a relatively small amount of the barley product so as not to change the essential food character of the composition involved.

I claim:

1. A method of producing a barley fraction having thickening properties when employed in aqueous compositions which comprises heat treating and milling barley; said milling comprising substantially dehulling the barley, pulverizing the barley until substantially all thereof is finer than about 20 mesh and at least about 45%, but less than 100%, thereof is finer than about 120 mesh, and separating from the pulverized barley a fraction having a mesh size coarser than about 120 mesh; said heat treating comprising heating the barley in the presence of steam at a temperature no less than about 212° F. for at least about 1 minute, the upper limit on temperature of heating and holding time being lower than that at which gelatinization of the starch in the barley occurs.

2. A method of producing a barley fraction having thickening properties when employed in aqueous compositions which comprises heat treating and milling barley; said milling comprising substantially dehulling the barley, pulversizing the barley until substantially all thereof is finer than about 20 mesh and at least about 45%, but less than 100%, thereof is finer than about 120 mesh, and separating from the pulverized barley a fraction having a mesh size finer than about 100 mesh and coarser than about 120 mesh; said heat treating comprising heating the barley in the presence of steam at a temperature no less than about 212° F. for at least about 1 minute, the upper limit on temperature of heating and holding time being lower than that at which gelatinization of the starch in the barley occurs.

3. A method of producing a barley fraction having thickening properties when employed in aqueous compositions which comprises substantially dehulling whole barley, heating the dehulled barley in the presence of steam at a temperature no less than about 212° F. for at least 1 minute, the upper limit on temperature of heating and holding time being lower than that at which gelatinization of the starch in the barley occurs, pulverizing the heat-treated barley until substantially all thereof is finer than about 20 mesh and at least about 45%, but less than 100%, thereof is finer than about 120 mesh, separating from the pulverized barley a fraction having a mesh size finer than about 100 mesh and coarser than about 120 mesh, and passing an air current through said fraction to remove hull residue.

4. A thickening agent for aqueous compositions comprising a milled substantially-enzyme-inactivated and substantially-hull-free barley fraction prepared by the method which comprises heat treating and milling barley; said milling comprising substantially dehulling the barley, pulverizing the barley until substantially all thereof is finer than about 20 mesh and at least about 45%, but less than 100%, thereof is finer than about 120 mesh, and separating from the pulverized barley a fraction having a mesh size coarser than about 120 mesh; said heat treating comprising heating the barley in the presence of steam at a temperature no less than about 212° F. for at least about 1 minute, the upper limit on temperature of heating and holding time being lower than that at which gelatinization of the starch in the barley occurs.

References Cited in the file of this patent

UNITED STATES PATENTS

| 1,555,170 | Trickey | Sept. 29, 1925 |
| 2,355,033 | Musher | Aug. 1, 1944 |
| 2,520,597 | Griffin | Aug. 26, 1950 |

OTHER REFERENCES

Canadian Journal of Chemistry, vol. 31 (1953), pp. 653 to 656.

American Society of Brewing Chemists Proceedings, 1952, pp. 96 and 97.

"Enzymes That Degrade Barley Gums, IV, Studies of Varietal Differences in Endo-$\beta$-Polyglucosidase Activity," E. J. Bass and W. O. S. Meredith, Cereal Chem. 33, 129–35 (1956), abstracted in Chem. Abstracts, vol. 50 (1956), abstract relied on.

"The Canned Food Reference Manual," 2nd ed. (1943), American Can Co. (New York) p. 71.